Dec. 14, 1937.   C. H. LUNDHOLM   2,102,541
PARACHUTE PACK
Filed Feb. 10, 1937
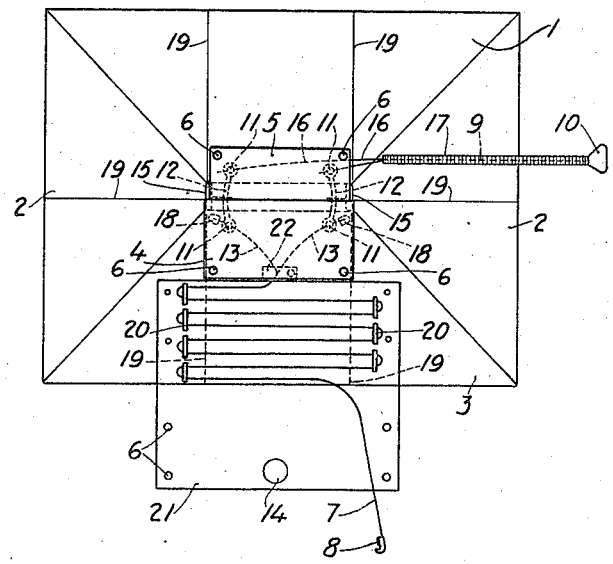
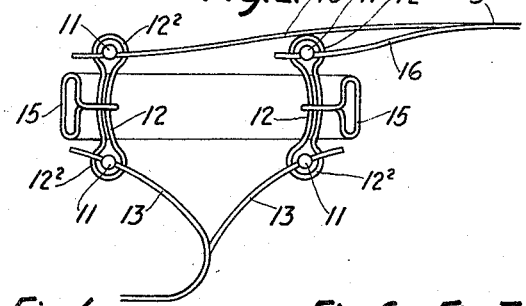
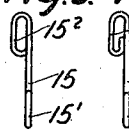 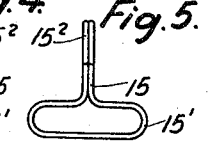 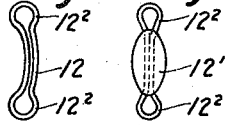
 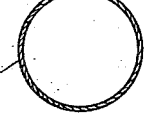
Inventor:

Patented Dec. 14, 1937

2,102,541

UNITED STATES PATENT OFFICE 2,102,541

PARACHUTE PACK

Carl Herman Lundholm, Stockholm, Sweden

Application February 10, 1937, Serial No. 125,038
In Sweden May 7, 1936

9 Claims. (Cl. 244—148)

The present invention relates to parachute packs and particularly to parachute packs of the type provided with automatic releasing means actuated by a pull in a line fixed to the aircraft as well as manual releasing means actuated by a cable to be pulled by hand by the parachutist which releasing means have each a separate locking pin or pins and in which a plurality of closing flaps are provided, e. g. two opposed main flaps and two opposed lateral flaps.

A parachute pack of this type is previously known in which at least three of the flaps, e. g. the two main flaps and at least one of the lateral flaps, are connected mainly at one point by a common loose locking member independent of the pack. In this known type of a parachute pack, the flaps are at their free ends provided with openings through which the common locking member is inserted, said locking member having preferably the form of an egg with holes at both of its ends through which holes the locking pins of the two releasing means are inserted. Thus in closed position of the pack the locking member forms substantially a right angle with the flap surface and, moreover, the locking pins are situated on different levels, viz the pin or pins of the one releasing means above and the pin or pins of the other releasing means below the surface of the pack flaps.

According to the present invention the said locking member in its entirety and all of the locking pins when the pack is in a closed position are situated mainly on the same level and on the outer surface of the pack. Thereby an easy inspection and control of all parts of both of the releasing means is ensured causing an increased safety of the function of the parachute.

A preferred embodiment of a parachute pack according to the invention is illustrated by way of example on the accompanying drawing in which:—

Fig. 1 is a plan view of the improved parachute pack, the static line being laid bare.

Fig. 2 is a plan view of the two releasing means on an enlarged scale.

Fig. 3 is a side view of a member adapted to be fixed to a lateral flap to hold the loose locking member in position.

Fig. 4 is a side view of another embodiment of such a holding member.

Fig. 5 is a plan view of Fig. 4.

Figs. 6 and 7 are plan views of different embodiments of a loose locking member.

Fig. 8 is a side view of a locking stud adapted to be fixed to a main flap.

Fig. 9 is a view of a loose locking member according to a preferred embodiment.

According to Fig. 1 reference numeral 1 designates a main pack flap carrying the manual releasing means, 2 lateral flaps and 3 another main flap carrying the automatic releasing means. Each of the flaps is combined with one or more elastic members 19 which tend to pull the flap aside when one of the releasing means is actuated in the manner to be described. 4 is a cover folded over the automatic releasing means and 5 a similar cover for the manual releasing means. 7 is a line adapted to actuate the automatic releasing means, the so called static line, said line having at its free end a snap hook 8 for the fastening of the line to the aircraft. The line 7 is packed within a pocket on flap 3 and held in packed position therein by means of straps 20, said pocket being adapted to be closed by a cover 21 (shown in unfolded position in Fig. 1) having an opening 14 through which the line 7 protrudes. 9 is a cable for actuating the manual releasing means said cable being protected by a tube 17 of rubber or the like and having at its free end a ring 10. At its other end the static line 7 terminates in locking pins 13, and similar locking pins 16 are provided at the end of the manually actuated pull cable 9. The end of the locking pins 13 is shown to be protected by a small cap 18 e. g. of leather fixed to the flap 3, and similar caps (not shown) may also be provided for the ends of the locking pins 16. Snap fasteners 6, serve to secure the covers 4, 5 and 21 in closed positions.

Permanently secured at the end edge of the main flaps 1, 3 are locking studs 11, and likewise permanently secured at the end of each of the lateral flaps 2 is a holding member 15 fixed to the flap by a loop $15^1$ and having at its other end another loop $15^2$. In closed position of the pack, the two main flaps 1, 3 and each of the lateral flaps 2, 2 are connected by a common loose locking member 12 which has a loop of flexible material at each of its ends (see also Fig. 2). The locking members 12 engage each the loop $15^2$ of one of the holding members 15 and have their loops $12^2$ threaded over studs 11 on the main flaps 1, 3 in such a manner as to uncover a hole in the studs through which the locking pins 13 and 16, respectively, are inserted, thereby securing the locking members 12 and, consequently, the whole pack in closed position.

The function is as follows:—

In packed position of the parachute pack the parts assume the position shown in Fig. 1 except that the cover 21 is folded over the pocket for the static line 7 and secured in position by the snap fasteners 6, said line protruding through the opening 14 in said cover 21.

On automatic release the snap hook 8 of the static line 7 must be fastened to the aircraft. When the parachutist jumps, the line 7 is drawn out of its pocket through the opening 14 under the action of the weight of the jumper. When the line 7 is fully pulled out and stretched, the locking pins 13 are drawn out through the holes in the corresponding studs 11 causing the loops $12^2$ of the locking members 12 previously retained by said locking pins 13 to be disengaged from said studs. Under the action of the pressure of the packed parachute as well as of the elastics 19 all of the flaps are pulled aside, the lateral flaps 2 being released by the locking members 12 sliding through the loops $15^2$ of the holding members 15. Then the parachute opens in usual manner.

The automatically actuated locking pins 13, in a locked position of the pack, are held down by a small flap 22, which at its one side is permanently fixed to the pack and at its other side is locked by a snap fastener. By means of this device entanglement of the static line 7 with the automatic locking pins is avoided, whereby the said pins can be pulled out before the static line has been fully drawn out of its pocket. Such an eventuality might in turn result in the parachute opening at too close proximity to the aircraft.

On manual release a pull is exerted in the cable 9 by the parachutist pulling the ring 10. Thereby the locking pins 16 are disengaged from the corresponding studs 11 causing opening of the flaps in the manner above described.

In order to secure a quick and reliable release it is of importance that the loops $12^2$ of the loose locking members 12 consist of soft and flexible material. According to Fig. 9 the locking member 12 has the form of an endless and seamless ring, consisting of thin metal wire, preferably formed in such manner that the wire is wound or twisted several times around the same wire or wires as a base, substantially in the same manner in which button holes are stitched. The locking member may consist of such a ring without further appliances which ring in such case in operative position assumes the shape shown in Figs. 2 and 6, or it may consist of a solid middle member $12^1$ having a hole through which a ring 12 is threaded as shown in Fig. 7.

It is also of advantage that the loops $12^2$ of the locking members 12 be as small as possible. For this reason the studs 11 should be disposed near the border of the main flaps 1, 3 and at their top be as small as possible whereby the loops $12^2$ can be reduced correspondingly facilitating the passage of said loops through the loops $15^2$ of the holding members 15. It is also of advantage that the studs 11 be shaped as a cone having a continuous smooth surface from its base to its top so as to exert no hindrances to the loops $12^2$ of the locking members 12 from sliding off the studs. According to Fig. 8 the stud 11 is turnable by being mounted on a pin on a small disk $11^1$, said pin engaging a hole in a washer $11^2$ which is provided with holes 23 by which the stud is sewn onto.

In order further to facilitate the passage of the loops $12^2$ of the locking members 12 through the loops $15^2$ of the holding members 15, said latter loops should be made of round smooth metal wire and be of sufficient largeness. The holding member 15 may be formed as shown in Fig. 3 in which the loop $15^2$ consists of a single wire, but to prevent deformation of the loop $15^2$ by the pressure of the weight of the aviator sitting on the parachute pack the loop $15^2$ consists preferably of a double wire which is bent inwardly as shown in Figs. 4 and 5.

Instead of using solid locking studs 11 it is possible to provide metal bordered openings at the corresponding places of the main flaps, in which case the loops $12^2$ of the locking members 12 are inserted through said openings from below, the locking pins 13 and 16 being then inserted into the protruding loops $12^2$. However, a greater safety is ensured by forming the studs in the manner illustrated in the drawing.

Having now particularly described the invention and the manner in which the same may be performed, what I claim is:—

1. A parachute pack, comprising a plurality of flaps, manually operable means including a locking pin to lock and release the flaps, automatically operable means including another locking pin to lock and release the flaps, either locking pin in locked position to the pack being independent of and being operable without releasably affecting the other, a loose locking member independent of the pack and adapted in combination with said locking pins to connect at least three of the flaps substantially at one point, said locking member and said locking pins being situated, in closed position of the pack, on the outer surface thereof and substantially on the same level.

2. A parachute pack, comprising a plurality of flaps, manually operable means including a locking pin to lock and release the flaps, automatically operable means including another locking pin to lock and release the flaps, either locking pin in locked position to the pack being independent of and being operable without releasably affecting the other, a loose locking member independent of the pack and having two opposite loops adapted each to co-operate with one of said locking pins, the locking member being adapted in combination with said lock pins to connect at least three of the flaps substantially at one point, said locking member and said locking pins being situated, in closed position of the pack, on the outer surface thereof and substantially on the same level.

3. A parachute pack, comprising a plurality of flaps, manually operable means including a locking pin to lock and release the flaps, automatically operable means including another locking pin to lock and release the flaps, either locking pin in locked position to the pack being independent of and being operable without releasably affecting the other, a loose locking member of flexible material independent of the pack and adapted in combination with the locking pins to connect at least three of the flaps substantially at one point, said locking member and said locking pins being situated, in closed position of the pack, on the outer surface thereof and substantially on the same level.

4. A parachute pack, comprising a pair of opposed main flaps and a pair of opposed lateral flaps, manually operable means including a locking member to lock and release the flaps, automatically operable means including another locking member to lock and release the flaps, either locking pin in locked position to the pack being independent of and being operable without releasably affecting the other, a loopshaped member secured to the end of a lateral flap, a loose locking member independent of the pack and adapted in combination with said locking pins and said loop-shaped member to connect said main flaps and said lateral flap substantially at one point, said locking member and said locking pins being situated, in closed position of the pack, on the outer surface thereof and substantially on the same level.

5. A parachute pack, comprising a pair of opposed main flaps and a pair of opposed lateral flaps, manually operable means including a locking pin to lock and release the flaps, automatically operable means including another locking pin to lock and release the flaps, either locking pin in locked position to the pack being independent of and being operable without releasably affecting the other, a locking stud permanently secured to each of said main flaps and provided with a hole, a loop-shaped member secured to the end of a lateral flap, a loose locking member independent of the pack and having two opposed loops adapted each to be threaded over one of said studs and to be secured in position by the corresponding locking pin engaging the hole in said stud, said loop-shaped member engaging said loose locking member so as to cause the latter to connect the main flaps and said lateral flap substantially at one point.

6. A parachute pack according to claim 1, wherein the loose locking member consists of thin metal wire formed as a ring.

7. A parachute pack according to claim 1, wherein the loose locking member consists of thin metal wire formed as a ring in such manner that the wire is wound several times around the same wire as a base.

8. A parachute pack according to claim 4, wherein the loop-shaped member consists of rigid metal wire.

9. A parachute pack, comprising a pair of opposed main flaps and a pair of opposed lateral flaps, manually operable means including two locking pins to lock and release the flaps, automatically operable means including two other locking pins to lock and release the flaps, either locking pin in locked position to the pack being independent of and being operable without releasably affecting the other, two locking studs permanently secured to each of said main flaps and having a hole therein, a loop-shaped member secured to the end of each of said lateral flaps, two loose locking members independent of the pack and having each two opposed loops, each of said loose locking members being connected with one of the loop-shaped members and with one of the studs of each main flap in such manner that it is threaded through the loop-shaped member and has its loops threaded over one of said studs, and is secured in position by one of the locking pins of the manual releasing means and the automatic releasing means, respectively, engaging the hole in the respective stud, each of said loose locking members thereby connecting the two main flaps and one of the lateral flaps and being controlled by both of said releasing means, the loose locking member upon the extraction of either category of locking pins gliding off the corresponding studs at one end, whereby said ends pass through the loop-shaped members secured to the lateral flaps thereby permitting the pack to open and free the parachute proper.

CARL HERMAN LUNDHOLM.